(12) United States Patent
Yee

(10) Patent No.: US 7,971,080 B2
(45) Date of Patent: Jun. 28, 2011

(54) POWER SAVINGS FOR A NETWORK DEVICE

(75) Inventor: Alan R. Yee, Los Gatos, CA (US)

(73) Assignee: Cisco Technology, Inc., San Jose, CA (US)

(*) Notice: Subject to any disclaimer, the term of this patent is extended or adjusted under 35 U.S.C. 154(b) by 780 days.

(21) Appl. No.: 11/844,533

(22) Filed: Aug. 24, 2007

(65) Prior Publication Data

US 2009/0055666 A1   Feb. 26, 2009

(51) Int. Cl.
   G06F 1/32   (2006.01)
   G06F 1/00   (2006.01)
(52) U.S. Cl. .................. 713/320; 713/300; 713/324
(58) Field of Classification Search .......... 713/320
   See application file for complete search history.

(56) References Cited

U.S. PATENT DOCUMENTS

| | | | |
|---|---|---|---|
| 6,496,103 B1* | 12/2002 | Weiss et al. | 375/257 |
| 6,943,667 B1 | 9/2005 | Kammer et al. | |
| 6,993,667 B1 | 1/2006 | Lo | |
| 7,395,365 B2* | 7/2008 | Fujita et al. | 710/313 |
| 7,652,483 B2* | 1/2010 | Huang et al. | 324/534 |
| 2003/0025930 A1 | 2/2003 | Tateyama | |
| 2005/0147082 A1 | 7/2005 | Keddy et al. | |
| 2005/0262368 A1* | 11/2005 | Cherukuri et al. | 713/324 |
| 2007/0121663 A1 | 5/2007 | Yousefi et al. | |

FOREIGN PATENT DOCUMENTS

EP   1868299 A2   12/2007

OTHER PUBLICATIONS

"International Application Serial No. PCT/US2008/073630, Search Report mailed Feb. 18, 2009", 5 pgs.
"International Application Serial No. PCT/US2008/073630, Written Opinion mailed Feb. 18, 2009", 7 pgs.

* cited by examiner

Primary Examiner — Suresh K Suryawanshi
(74) Attorney, Agent, or Firm — Schwegman, Lundberg & Woessner, P.A.

(57) ABSTRACT

An example embodiment is illustrated to reduce power consumed by inactive connections. This embodiment may include detecting a connection condition signifying a requirement for an active connection between one network device and another network device. Thereafter, an enable instruction may be retrieved based upon the detecting of the connection condition, and a port may be enabled based upon the retrieved enable instruction resulting in increased electrical power consumption by a port component. The electrical power consumption may be increased relative to a prior level of electrical power consumption in which the port is disabled.

32 Claims, 13 Drawing Sheets

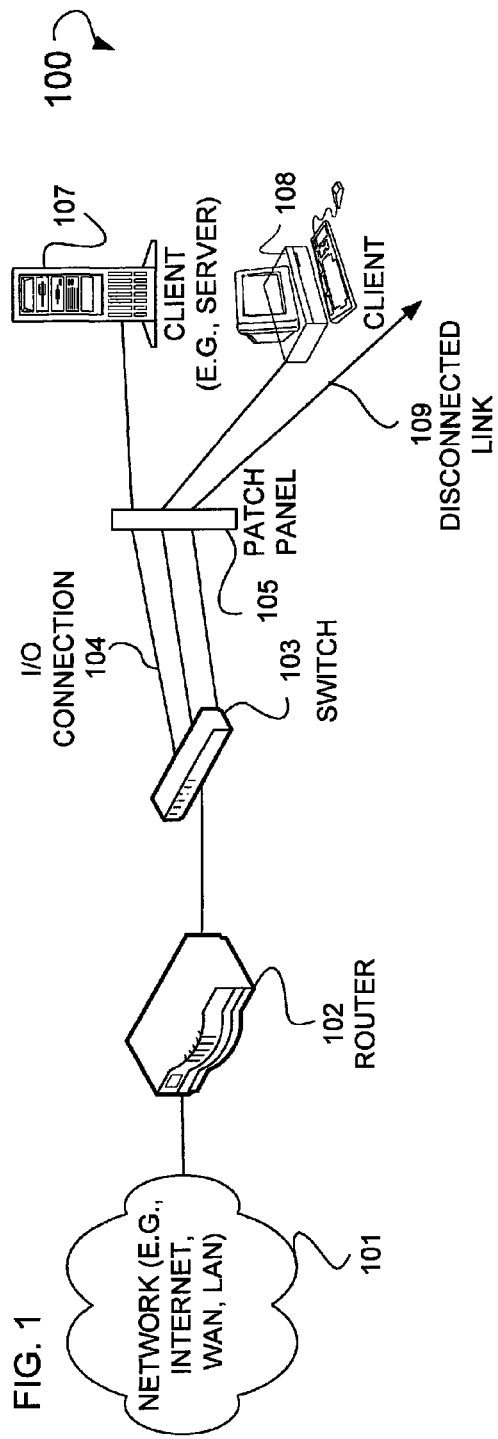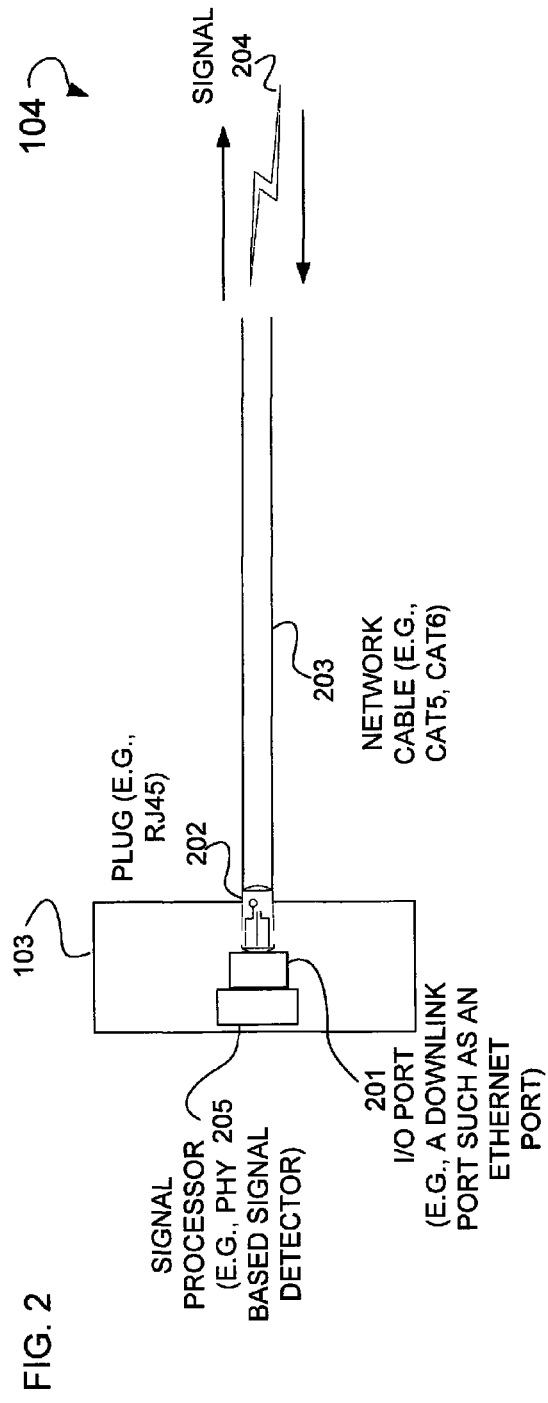

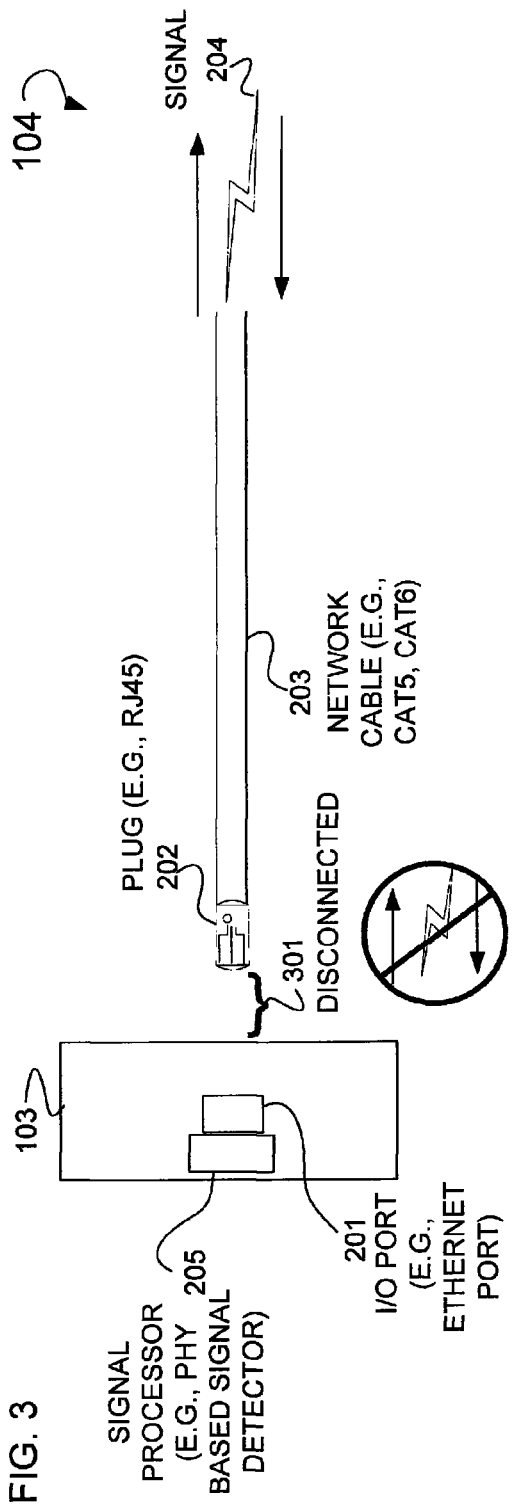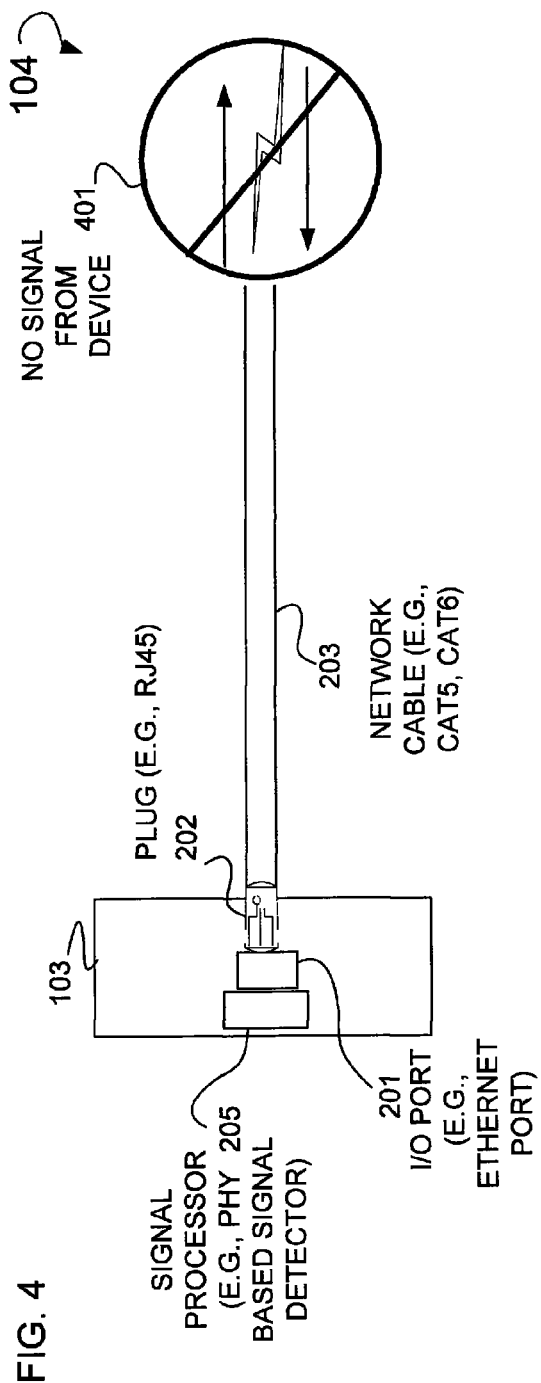

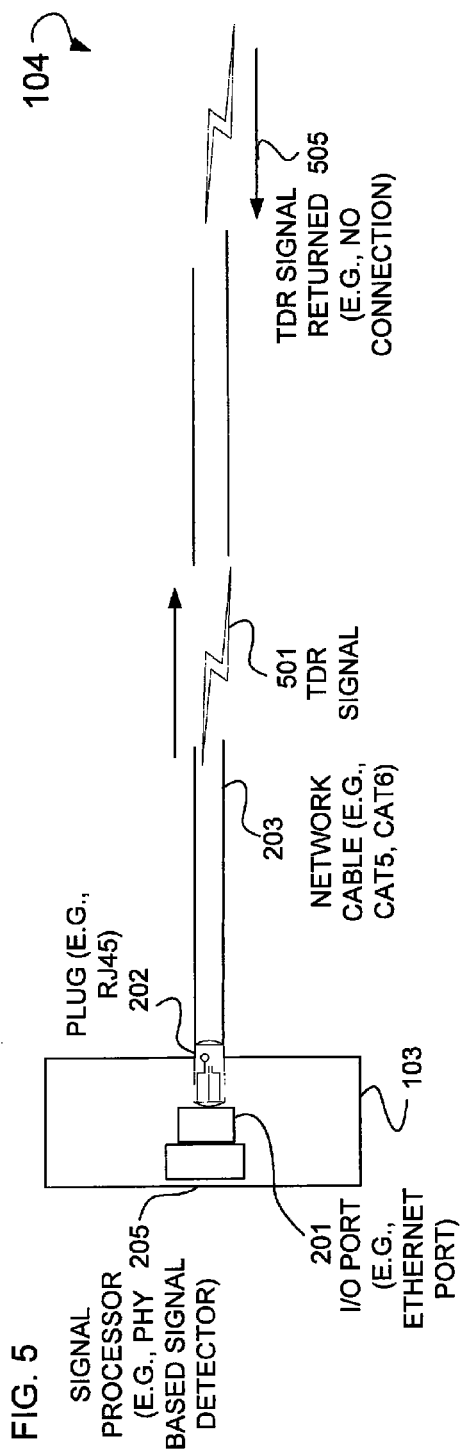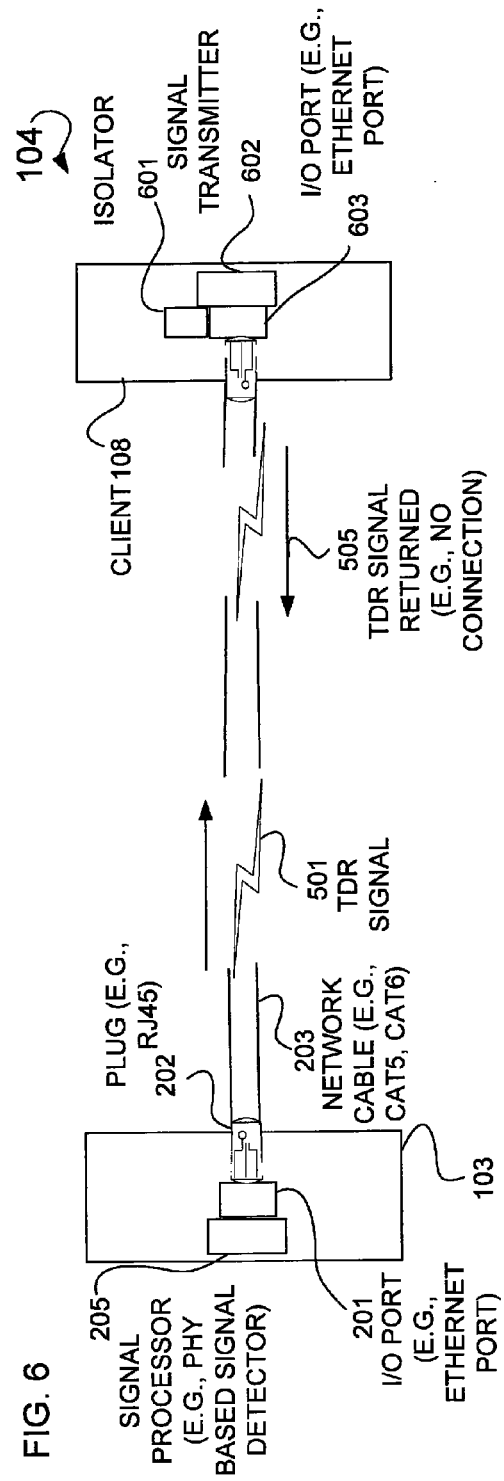
FIG. 5
FIG. 6

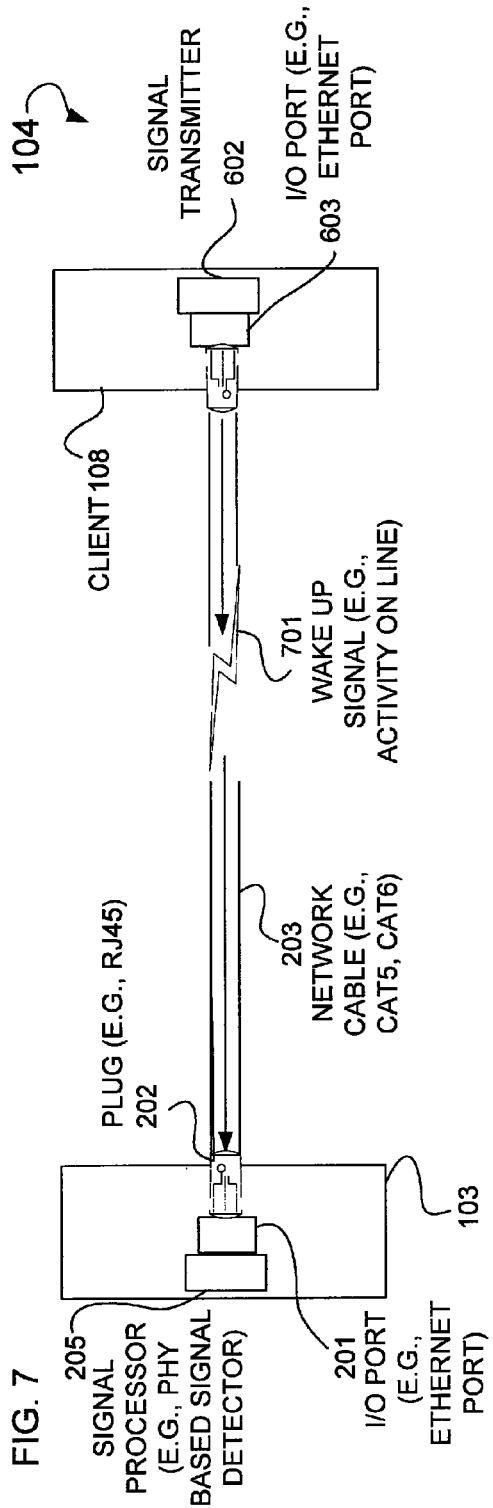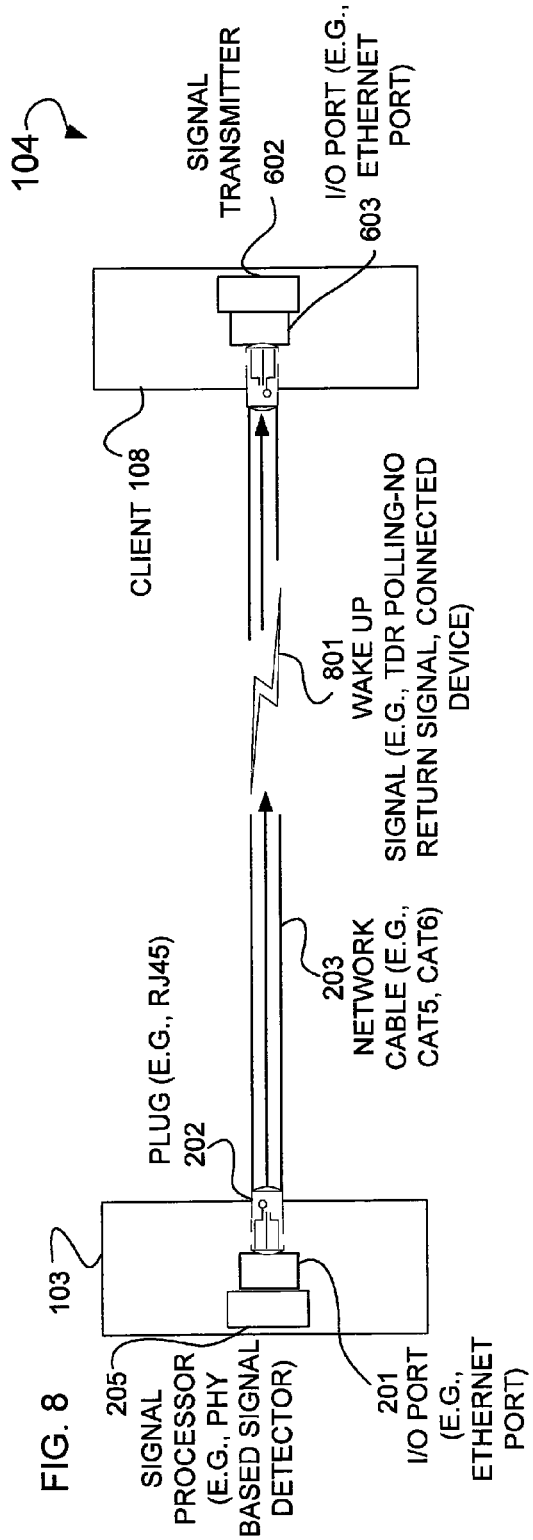

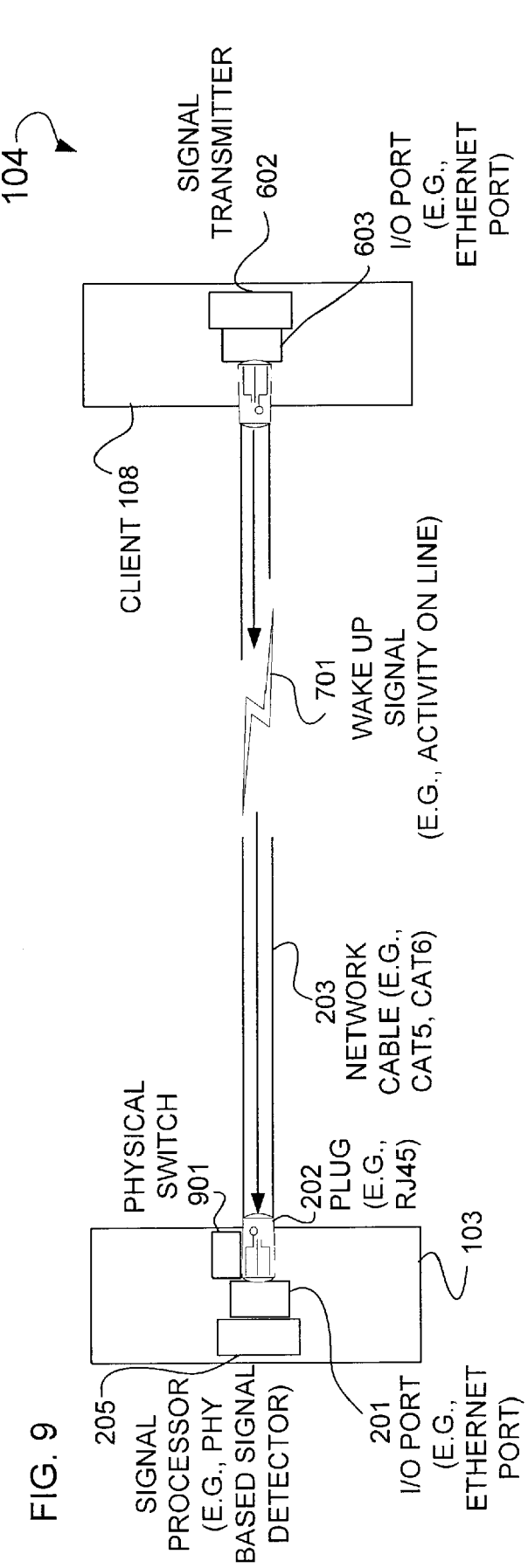

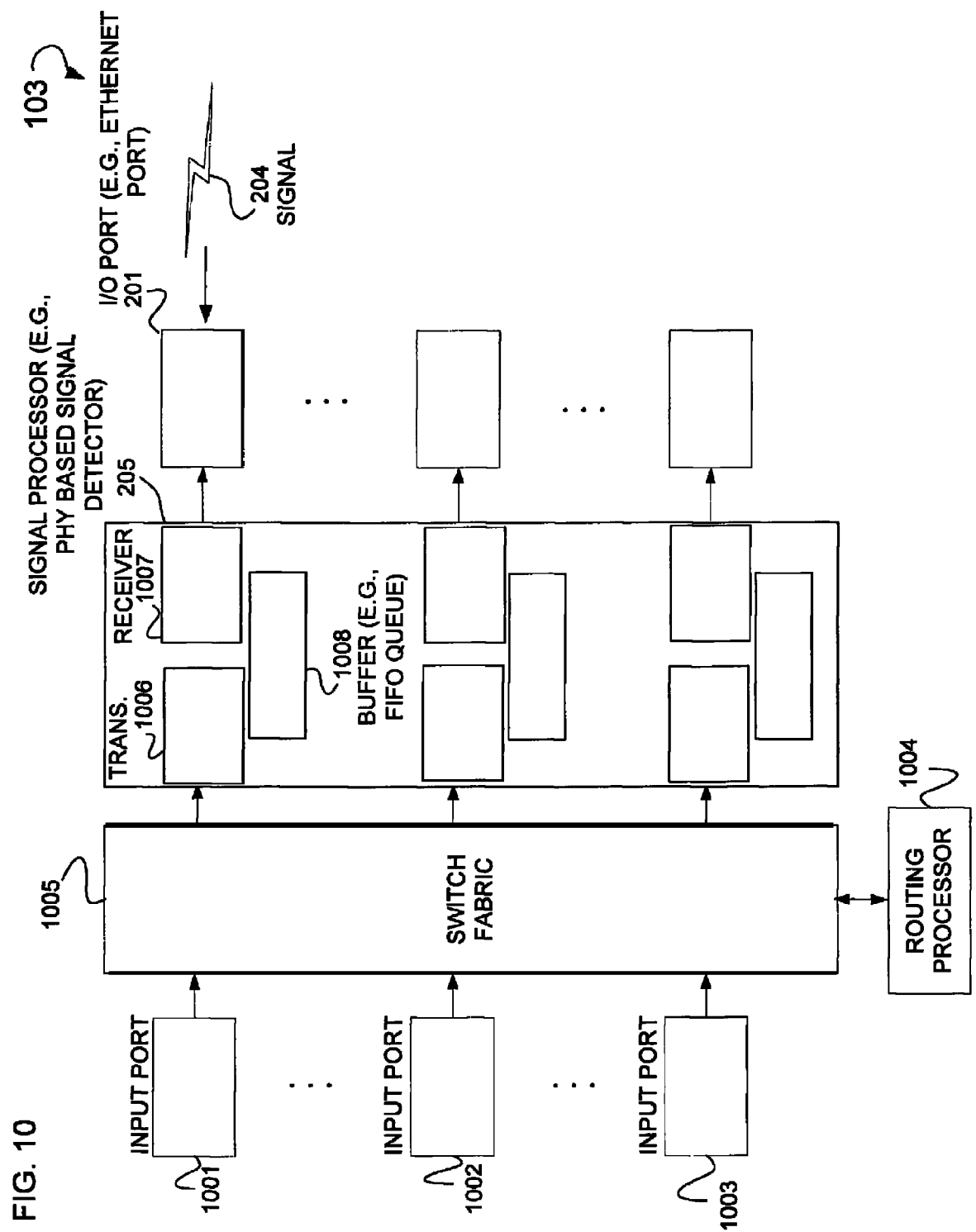

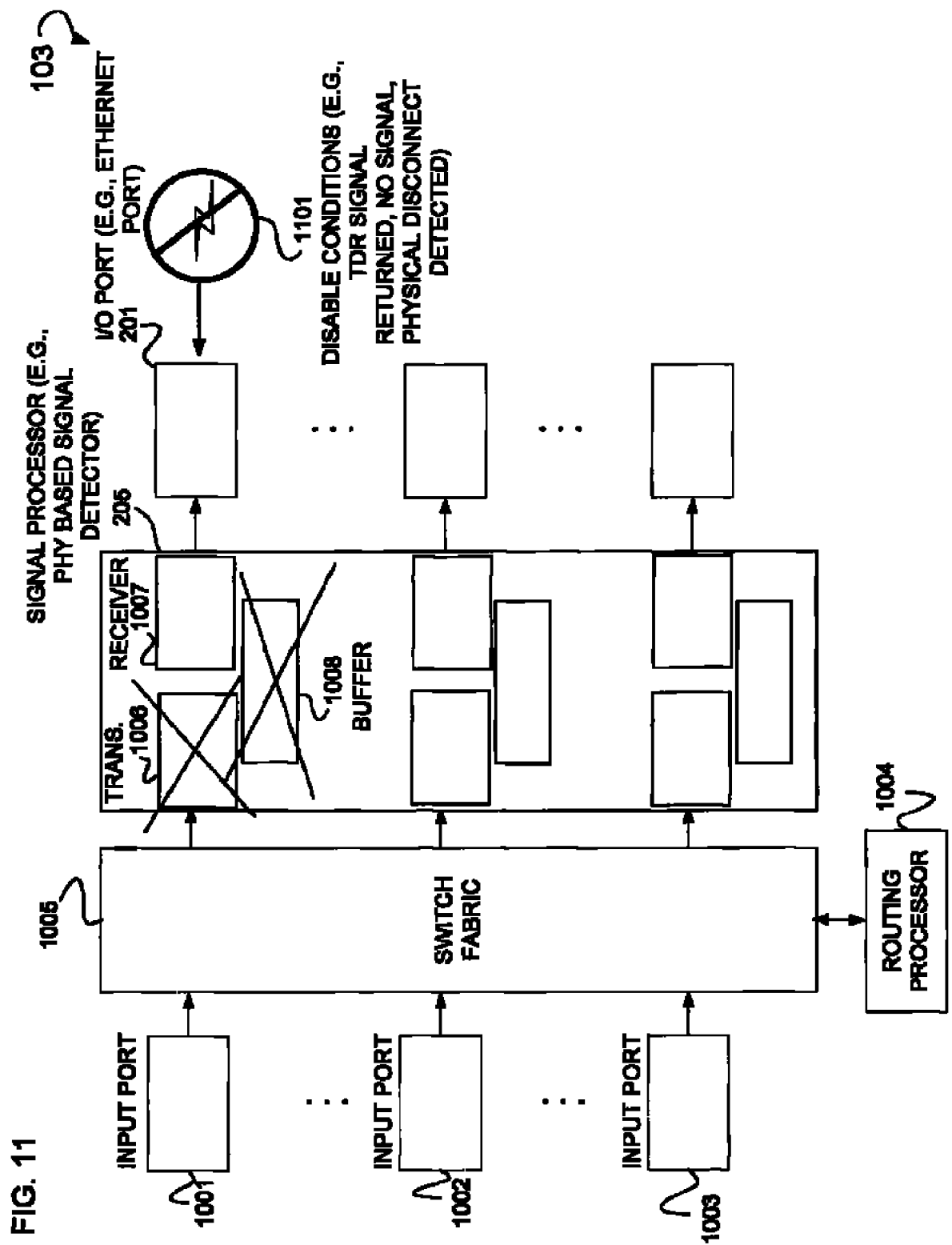

POWER SAVINGS FOR A NETWORK DEVICE

FIELD

The present disclosure relates generally to power savings for a network device.

BACKGROUND

Unused network connections consume and waste a large amount of electrical power where, for example, they are required to be kept active. This waste of electrical power is exacerbated by higher capacity links that are now coming into use which consume even larger amounts of electrical power. These higher capacity links consume this electrical power even in cases where the link is under utilized.

BRIEF DESCRIPTION OF DRAWINGS

The present invention is illustrated by way of example and not limitation in the figures of the accompanying drawings, in which like references indicate similar elements and in which:

FIG. 1 is a diagram of a system, according to an example embodiment, to conserve power in a network device.

FIG. 2 is a diagram of an Input/Output (I/O) connection, according to an example embodiment, that may form part of a network device such as a switch.

FIG. 3 is a diagram of an I/O connection, according to an example embodiment, illustrating a disconnect state or condition (e.g., a physical disconnect).

FIG. 4 is a diagram of an I/O connection, according to an example embodiment, where an I/O port, and an associated signal processor, is disabled when no signal is detected.

FIG. 5 is a diagram of an I/O connection, according to an example embodiment, illustrating disablement of a connection occurring as a result of Time Domain Reflectometry (TDR).

FIG. 6 is a diagram of an I/O connection, according to an example embodiment, wherein a network device such as a switch is operatively coupled to a client via a network cable and an isolator is used to stimulate an open connection response (e.g., reflect a TDR signal).

FIG. 7 is a diagram of an I/O connection, according to an example embodiment, illustrating a wake-up sequence based upon the existence of line activity.

FIG. 8 is a diagram of an I/O connection, according to an example embodiment, showing detecting of a connection as a result of analysis of cable parameters.

FIG. 9 is a diagram of an I/O connection, according to an example embodiment, illustrating the use of a physical switch to determine the existence of a cable connection.

FIG. 10 is a block diagram of a network device, according to an example embodiment, such as a switch illustrating example blocks, and associated functionality associated with these blocks.

FIG. 11 is a block diagram of a network device, according to an example embodiment, such as a switch illustrating a partial port disable, and components (e.g., PHY components) that may be actually powered down.

DESCRIPTION OF EXAMPLE EMBODIMENTS

Figure 12:
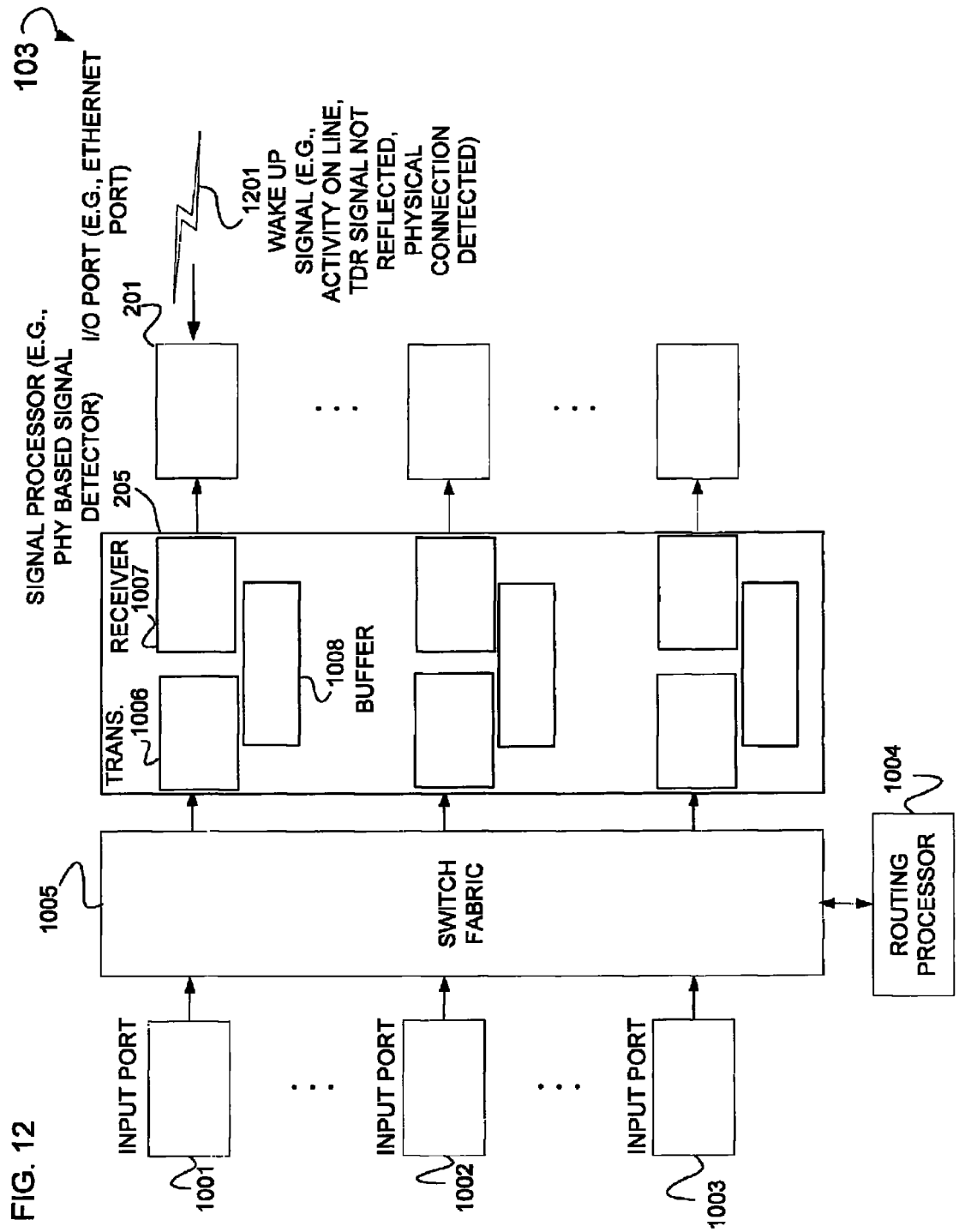
FIG. 12 is a block diagram of a network device, according to an example embodiment, such as a switch illustrating wake-up conditions and example components (e.g., PHY components) that are powered up.

In the following description, for purposes of explanation, numerous specific details are set forth in order to provide a thorough understanding of an embodiment of the present invention. It may be evident, however, to one skilled in the art that the present invention may be practiced without these specific details.

Overview

In one example embodiment, a method is illustrated as including detecting a connection condition signifying a connection relating one network device to another network device, retrieving an enable instruction based upon the detecting of the connection condition, and enabling a port based upon the retrieved enable instruction resulting in increased electrical power consumption by a port component, the electrical power consumption increased relative to a prior level of electrical power consumption in which the port is disabled.

Further, in an example embodiment, a method is illustrated as including detecting a disable condition that initiates disabling of a port on a network device, retrieving a disable instruction based upon the detecting of the disable condition, and disabling the port based upon a retrieved disable instruction resulting in reduced electrical power to a component, the electrical power reduced relative to a prior level of electrical power in which the port is enabled.

Example Embodiments

In example embodiments, certain power savings modes based upon various detection schemes are illustrated. These power savings modes may be absolute or relative in nature. Further, these power savings modes may include enabling or disabling a network device based upon, for example, detection of an Ethernet connection, and may involve the partial disabling or enabling of a network device and associated network ports. The concepts of enabling and disabling may include the concepts of turning-on power or powering-up, and shutting-off power or powering-down respectively. In some example embodiments, a first network device is operatively connected to another network device via, for example, a network connection (e.g., a port). Next, if the first and second network devices are not operatively connected, then the network device (e.g., the port) is at least partially shutdown (e.g., the power to the port is reduced) or totally shutdown (e.g., turned off) to save power. Subsequently, if the first network device detects a requirement for an operative connection to the second network device, the network port is powered up or otherwise provided electrical power. This may occur transparently.

In one example embodiment, the physical presence or absence of a cable or client device attached to an ethernet port is used to determine whether a network port, and its associated logic, should be shut down, disabled, or placed in low power mode or condition to conserve power. This Ethernet port may reside on a network device such as a router, a switch, a bridge, or other any network appliance. The physical presence of the cable may, for example, be detected using existing cable diagnostic functions, or any electromechanical device (e.g., a switch, relay, or the like). In an example embodiment, the power savings may result from the inactivity of logic in the switch, in addition to the removal of the power from one or more ports of the switch.

Example embodiments may further include facilitating the selection of unused ports and forcing these ports into a power savings mode (e.g., shut down or disabled). The ports may, for example, be forced into the power savings mode based upon the physical presence or absence of a cable, a particular configuration of a client associated with the ports, the lack of an electrical signal on a port, etc. Further, in some example embodiments, as mentioned above, a cable diagnostic function, an electromechanical switch or relay to detect cable-less ports is implemented. In an example embodiment, ports (e.g., I/O ports) without cables connected thereto may be shutdown all the way back through the switch fabric to conserve electrical power. Additional example embodiments may include a variation wherein the client device disconnects from a line and presents a high impedance load to the switch to simulate an unused port and invokes a port shut down in the switch. Alternatively, in some example embodiments, the switch may monitor a receive lines on a switch bus for the presence of any electrical signals (e.g., toggling) to determine if a client is present and/or active. Alternatively, in one example embodiment, the network switch could monitor the receive pins of the port to determine if the client is present and/or active. The absence/inactivity of a client could be indicated by the lack of any electrical signals on the receive pins.

In one example embodiment, a network device such as a router, switch, bridge, load balancing appliance or other network device is operatively coupled to a client device (e.g., a computer system) via a network connection (I/O connection) such as an Ethernet connection, Data Over Cable Service Interface Specification (DOCSIS) connection, or other suitable connection. Once the I/O connection is formed, a wake-up signal (e.g., a connection condition) may be detected by the network device. This wake-up signal may take the form of an electrical signal, or some other suitable signal such as an optical signal. This wake-up signal may, for example, be detected by the discharge of a charged capacitor, using an optical detection mechanism, or using an optical-electrical switch. In some example embodiments, this connection condition contains an un-encoded signal such as mere electrical pulse.

In some example embodiments, a detector in the form of a PHY-based signal detector, an electromechanical switch/relay, or a software-enabled device resides on the I/O port to detect a wake-up signal to power up a port for operation. When the wake-up signal is detected, the detector may transmit an enable signal to one or more electrically powered components (collectively port components) that are associated with an I/O port. These port components may include, for example, transmitters, buffers, encoders, decoders, parallel-to-serial and/or serial-to-parallel converters, and other suitable port components. Once an output port is powered up for use, it may receive data from the client device connected via the I/O connection.

In some example embodiments, a cable diagnostic mechanism is used to determine whether a port should be enabled or disabled. In some example embodiments, this cable diagnostic mechanism may be configured to detect cable parameters by optionally transmitting a signal on the interface. If no response to the signal is detected this may denote the lack of a functioning device connected to the cable signifying that a power saving mode should be entered. For example, in one example embodiment, a TDR signal is transmitted by the network device through a polling operation. In cases where the TDR signal is reflected, a client device is known not to be connected, or at least operatively connected to the network device. For example, the client device may be connected but have an isolator that reflects the TDR signal when the client device is not in use. When this signal is not reflected, the network device may be enabled or forced into an operative mode as described by way of example above.

Some example embodiments may include detecting under utilization of a network connection as the basis to disable (e.g., power down) an I/O port. This detected under utilization may be in the form of a lack of activity (e.g., electrical or optical inactivity) on the cable connected to an I/O port. Further, this under utilization may be detected from cable analysis such as a TDR result, or a physical disconnect of the cable making up part of the I/O connection from the network device. Further, an optical detection mechanism, or an optical-electrical switch may be used to detect under utilization of the network connection. Once the under utilization is detected, various port components associated with the I/O port residing on the network device may be disabled, powered down, or placed in a lower power mode. These various port components include, for example, transmitters, buffers, encoders, decoders, parallel to serial and/or serial to parallel converters, or the like.

Example systems and methods may be employed in a variety of network environments. For example, an example embodiment may not only be deployed in an Ethernet based network, but may also be deployed in a DOCSIS based network that utilizes DOCSIS network devices such as cable modems, cable modem termination system, and other DOCSIS related devices. Other networks may also be used including Asynchronous Transfer Mode (ATM) based networks, Plain Old Telephone System (POTS) based networks, and devices supporting such networks.

FIG. 1 is a diagram of an example system 100, in accordance with an example embodiment, to conserve power in a network device. Illustrated, by way of example, is a network 101 to which a router 102 is operatively coupled. In addition to or instead of the router 102, one or more other suitable network appliance such as a bridge, switch, or other suitable network appliance may be used. Operatively coupled to the router 102 is a switch 103. Again, instead of or in addition to the switch 103, some other suitable network appliance may be used. This switch 103 has a number of I/O connections such as I/O connection 104 that connect the switch 103 to, for example, a patch panel 105. The I/O connection 104 may use, for example, a patch cord in its hardware embodiment. In addition to or instead of the patch panel 105, some other type of suitable hardware interface may be used. Operatively coupled to the patch panel 105 is, for example, a client 107 (e.g., a server), a client 108 (e.g., a personal computer), or a disconnected link 109.

FIG. 2 is a diagram of an example I/O connection 104. Illustrated is an I/O port 201 (e.g., a downlink I/O port) that may exist as a part of the previously illustrated switch 103. Further, the switch 103 is also shown to include a signal processor 205 which may, for example, be a PHY-based signal detector. This PHY-based detector may contain a number of components (e.g., port components) such as, for example, a transmitter, a receiver, a buffer, a decoder/encoder, and a number of other components. A plug 202 is shown to be inserted into the I/O port 201. The plug 202 may be, for example, an RJ45 plug or an eight position, eight connector (8P8C) type plug. The plug 202 may be operatively coupled to a network cable 203. The network cable 203 may, for example, be a CAT5 or CAT6 cable. A signal 204 is shown to be communicated along the network cable 203. It will be understood that the signal 204 may utilize any one of a number of protocols such as, for example, the Ethernet protocol, or some other suitable network protocol.

FIG. 3 is a diagram of an example I/O connection 104 illustrating a disconnect state in the form of a physical disconnect. In some embodiments, the I/O port and the signal processor associated with the I/O port may be disabled where, for example, one or more particular disable cases exist. One of these disable cases may be the case where there is a physical disconnect between, for example, the I/O port 201 and the plug 202. For example, illustrated is a disconnect 301 whereby the plug 202 is removed from the I/O port 201 such that the signal 204 is no longer detected by the signal processor 205. As will be more fully illustrated below, where a physical disconnect occurs, various components of the signal processor (e.g., the PHY) may be shut down or disabled so as to conserve electrical power.

FIG. 4 is a diagram of an example I/O connection 104 wherein the disablement of an I/O port and an associated signal processor (e.g., I/O port 201 and signal processor 205) occurs when no signal is detected. In certain example embodiments, the plug 202 may be inserted into or plugged into the I/O port 201 such that a signal could potentially be detected by the signal processor 205 associated with I/O port 201. In circumstances when no signal is detected, as illustrated at 401, then a disablement of the network port may occur. The signal may be an electrical signal, wherein the lack of the signal results, as previously illustrated, in a disablement of the signal processor namely the PHY-based detector and its associated components (e.g., port components). This disablement may be absolute (e.g., power may be shut down) or relative (e.g., a reduction in power compared to a previous power consumption level).

FIG. 5 is a diagram of an example I/O connection 104 illustrating a disablement occurring as a result of using TDR. Illustrated is a TDR signal 501 that is transmitted across the network cable 203 by, for example, a transmitter forming a part of the signal processor 205. This TDR signal 501 is transmitted across the network cable 203. In cases where the TDR signal is returned, indicating an open circuit, such as is illustrated at 505, a disable sequence will occur such that the signal processor 205 and some of its associated components will be powered down. The use of TDR signals is more fully illustrated below.

FIG. 6 is a diagram of an example I/O connection 104 wherein a disablement occurs through the use of an isolator residing on a client device. Shown is a TDR signal 501 that is transmitted down the network cable 203. Using an isolator 601, the client 108 facilitates the return (e.g., reflects) of this TDR signal. Based upon this reflected signal, the switch 103 and, more specifically, the signal processor 205 operatively coupled to the I/O port 201, a disable sequence is performed. In contrast to FIG. 5, where a TDR signal 505 is reflected based upon the lack of a network device being connected to the switch 103 via the network cable 203, here, by using the isolator 601, the TDR signal 505 is returned even when a client device such as client 108, is connected to the switch 103. In effect, this isolator allows for the TDR signal 505 to be returned as if no device was operatively coupled to the switch 103 through the network cable 203. Additionally, illustrated by way of example as a part of the client 108 is a signal transmitter 602 and an I/O port 603.

FIG. 7 is a diagram of an example I/O connection 104 illustrating a wake-up sequence based upon line activity. Illustrated is a signal transmitter 602 that generates some type of electrical activity (illustrated here as a wake signal 701). At the switch 103, the signal processor 205 detects the electrical activity and, hence, wakes up or otherwise provides the initiation of electrical power to the various components (e.g., port components) of the PHY that were previously shut down or powered down. This wake-up signal 701 may be, for example, an electrical signal or some other type of signal denoting activity on the line.

FIG. 8 is a diagram of an example I/O connection 104 showing a wake-up signal that may be a part of some type of wake-up signal such as periodic a cable diagnostic signal. Illustrated is a signal processor 205 that, in some embodiments, periodically transmits a TDR signal wherein it, in effect, creates a poll used to determine the existence of a device operatively coupled to the switch 103 via the previously illustrated network cable 203. In one example embodiment, the signal processor 205 transmits a TDR signal and then listens for a return signal (e.g., a TDR signal reflection). When the return signal is detected, the signal processor 205 determines that no device is operatively coupled to the switch 103 via the network cable 203. In cases where, however, the TDR signal is not returned, then the signal processor 205 determines that a device is in fact operatively coupled to the switch 103 via the network cable 203 such that an enable sequence may be initiated. This enable sequence may, for example, enable various components (e.g., port components) of a PHY that were previously shut down.

FIG. 9 is a diagram of an example I/O connection 104 illustrating the use of a physical switch. In some example embodiments, a physical switch may be used to determine whether or not a client detection procedure should be initiated. In cases where the physical switch is tripped or otherwise activated, an enable sequence may begin for a signal processor 205 and, more specifically, the PHY and its associated components. This physical switch may be as simple as some type of electromechanical switch or other type of switch used to determine the existence of a physical connection between a network cable such as network cable 203 and an I/O port such as I/O port 201.

FIG. 10 is a block diagram of an example network switch 103 illustrating example functional blocks of the switch 103. Illustrated are three example input ports 1001, 1002, and 1003. These input ports provide input, in the form of data, to a switch fabric 1005. The switch fabric 1005 is controlled by a routing processor 1004. This routing processor 1004 determines where the data flowing into the input ports should be directed (e.g., to what I/O port). Once the data is processed through the switch fabric 1005, it is provided to a signal processor 205 associated with an I/O port 201. This signal processor 205 may be a PHY-based signal detector or signal processor. Some of the components (e.g., port components) that may be a part of this signal processor 205 may include, for example, a transmitter 1006, a receiver 1007, and a buffer 1008. The buffer 1008 may, for example, provide a First-In-First-Out (FIFO) queue. The I/O port 201 may be the basis through which, for example, a signal 204 is detected. Other example port components of the signal processor 205 may include a decoder/encoder, a serial-to-parallel converter or a parallel-to-serial converter, a checksum device, or some other device to determine whether or not the packet sizes of the data are correct or not in a series of other components. These various blocks of functionality may be implemented in hardware, firmware, software, or through some other suitable application.

FIG. 11 is a block diagram of the switch 103 illustrating a disable sequence and the various components of the switch 103 and signal processor 205 that are, in one example embodiment, actually powered down. As a threshold matter, the concept of powered down may be understood in absolute terms (e.g., as the complete absence of electrical power), or in relative terms (e.g., reduction from a higher electrical power consumption state to a lower electrical power consumption state). Illustrated is a disable condition 1101 wherein this disable condition may be, for example, the previously illustrated reflected TDR signal, the lack of a signal or no signal or, for example, a physical disconnect. In cases where one of the disable conditions is detected, then one or more of the components associated with the signal processor 205 may be disabled or powered down. For example, the transmitter 1006 may be disabled or powered down, the buffer 1008 may be disabled or powered down or, for example, one of the previously illustrated encoder/decoders may be powered down. Further, one or more of the serials-to-parallel, or parallel-to-serial, converters may have reduced power provided to them, or even a checksum block may be shut down. In some embodiments, a partial disablement of the signal processor 205, and any other hardware not requiring power as a result of the inactivity of the port, may occur.

FIG. 12 is a block diagram of a switch 103 illustrating various enable or wake-up signals. Illustrated is a wake-up signal 1201 in the form of, for example, electrical activity on a line, a TDR signal that is not reflected, or even the detection of a physical connection via an electromechanical switch. In some example embodiments, an optical detection mechanism or optical-electrical switch may be used to detect a connection. When one of these wake-up signals 1201 occurs, then one or more of the port components associated with the signal processor 205 (e.g., the PHY-based detector) may be activated, such as, for example, the transmitter 1006, the buffer 1008 or one or more of the previously illustrated components. As previously mentioned, the concept of activated may be understood in absolute terms (e.g., going from a state of the complete absence of electrical power to a state of providing electrical power), or in relative terms (e.g., moving from a lower electrical power consumption/provision state to a higher electrical power consumption/provision state). In some example embodiments, a partial enablement of a PHY may occur.

Example Method

Figure 13:
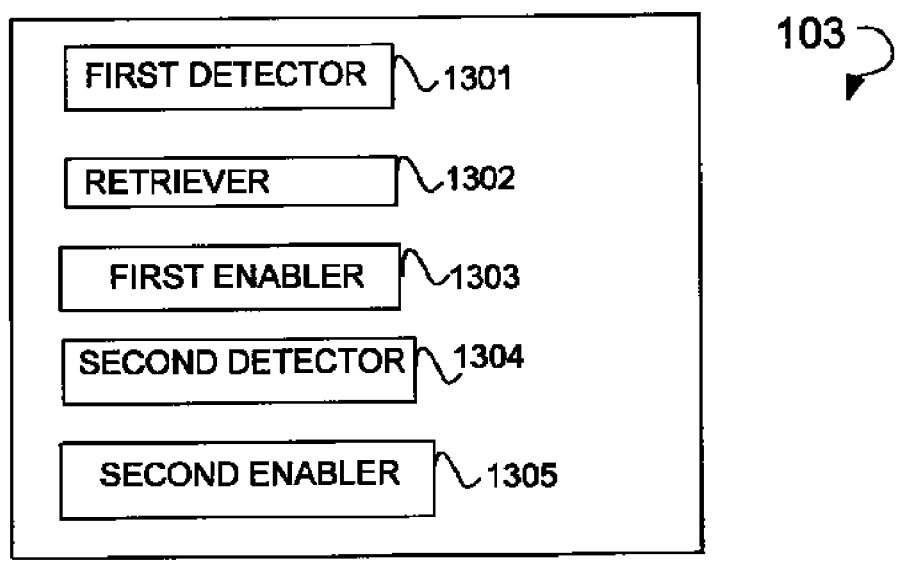
FIG. 13 is a block diagram illustrating a network device, according to an example embodiment, used for detecting a connection condition.

FIG. 13 is a block diagram illustrating an example network device such as a switch 103, and some example components associated with this switch. These components, in some example embodiments, may be implemented in hardware, firmware, or even software. Illustrated is a network device that includes a first detector 1301 to detect a connection condition to signify a connection relating one network device to another network device, a retriever 1302 to retrieve an enable instruction based upon the detecting of the connection condition, and a first enabler 1303 to enable a port based upon the retrieved enable instruction resulting in increased electrical power consumption/provision by a port component, the electrical power consumption increased relative to a prior level of electrical power consumption in which the port is disabled. Further, the network device may include a second detector 1304 to detect the connection condition using at least one of a line activity detector, a TDR detector, an electro-mechanical switch, a discharge of a capacitor, an optical-electrical switch, or an optical detector. Additionally, the second detector 1304 may be used to detect the connection condition using a PHY-based signal processor. Moreover, the enable instruction is provide by a configuration command so as to enable at least one of a line activity detector, a TDR detector, an electro-mechanical switch, a discharge of a capacitor, an optical-electrical switch, or an optical detector. Additionally, a second enabler 1305 is illustrated to provide increased electrical power to a component of a PHY-based signal processor based upon the retrieved enable instruction, the electrical power increased relative to a prior level of electrical power. Further, the port may be a downlink I/O port. In some example embodiments, the port component includes at least one of a transmitter, a buffer, an encoder, a decoder, a parallel to serial converter, or a serial to parallel converter.

Figure 14:
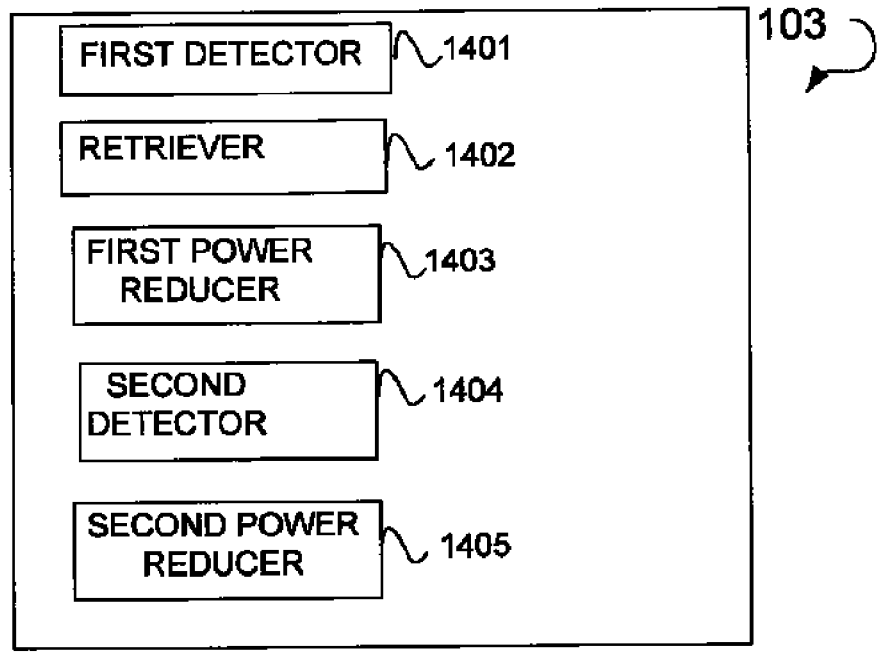
FIG. 14 is a block diagram illustrating a network device, according to an example embodiment, used for detecting a disable condition, according to an example embodiment.

FIG. 14 is a block diagram illustrating an example network device such as a switch 103, and some example components associated with this switch. These components, in some embodiments, may be implemented in hardware, firmware, or even software. Illustrated is a network device that includes a first detector 1401 to detect a disable condition that initiates a disabling of a port on a network device, a retriever 1402 to retrieve a disable instruction based upon the detecting of the disable condition, and a first power reducer 1403 to disable a port component based upon a retrieved disable instruction resulting in reduced electrical power to a component, the electrical power reduced relative to a prior level of electrical power in which the port is enabled. Further, a second detector 1404 is shown to detect the disable condition using at least one of a line activity detector, a TDR detector, an electro-mechanical switch, a discharge of a capacitor, an optical-electrical switch, or an optical detector. Next, a second detector 1404 is shown to detect the disable condition using a PHY-based signal processor. Additionally, the disable instruction may be provided by a configuration command so as to disable at least one of a line activity detector, a TDR detector, an electro-mechanical switch, a discharge of a capacitor, an optical-electrical switch, or an optical detector. Further, a second power reducer 1405 is shown to disable a port in a PHY, based upon the retrieved disable instruction resulting in reduced electrical power, the electrical power reduced relative to a prior level of electrical power. Moreover, the port may be a downlink I/O port. In some example embodiments, the port component includes at least one of a transmitter, a buffer, an encoder, a decoder, a parallel to serial converter, or a serial to parallel converter.

Figure 15:
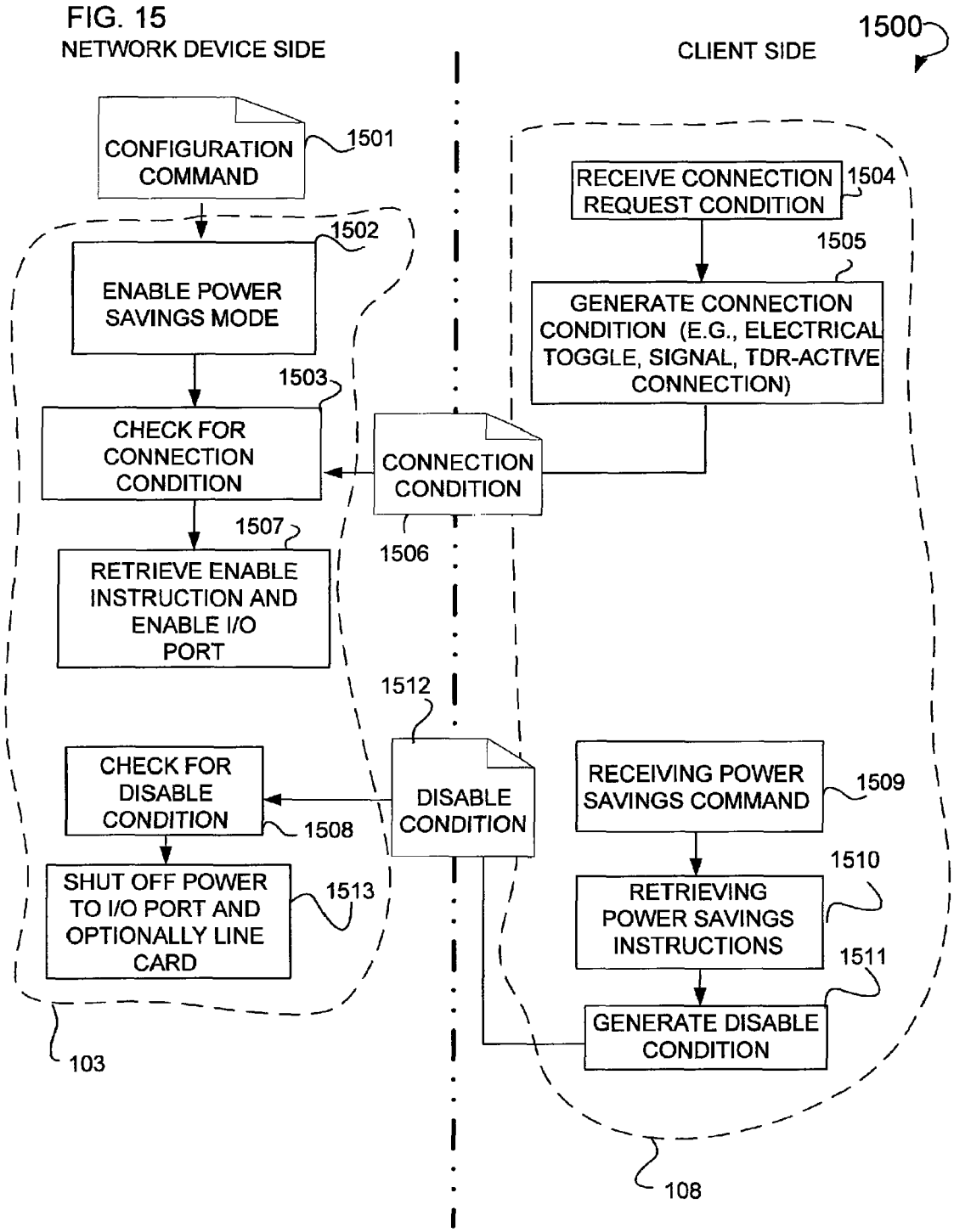
FIG. 15 is a dual stream flowchart illustrating a method, according to an example embodiment, of enabling and disabling a network device and ports associated therewith.

FIG. 15 is a dual stream flowchart illustrating an example method 1500. Shown is a dual stream flowchart with the first stream titled "Network Device Side" and the second stream titled "Client Side". Starting with the network device side, a configuration command 1501 is provided to, for example, a switch 103. This configuration command 1501 may contain the bases for the enable or disable conditions. In some cases, an operation 1502 residing on the switch 103 may be executed such that a power savings mode is enabled. Next, an operation 1503 is executed that checks for a connection condition. This connection condition may be generated, for example, by a client side device such as, for example, the client 108. Residing in the client 108 may be, for example, an operation 1504 which, when executed, receives connection request condition. Once received, an operation 1505 is executed that generates connection condition such as, for example, an electrical toggle, a signal, a TDR active connection, or some type of connection condition. This connection condition, now a connection condition 1506, is detected by the execution of the operation 1503. Once the connection condition 1506 is detected, an operation 1507 is executed that retrieves enable instructions and, in effect, powers up the I/O port. More specifically, in an example embodiment, the I/O port and associated signal processor 205 (e.g., the PHY and its associated components) are powered up. This enable may extend to the switch fabric, line card and other suitable component that may have been powered down. This enabling may be absolute (e.g., going from no power to some level of increased power), or may be relative (e.g., going from a lower power level to a higher power level).

In some example embodiments, a disable condition 1512 is generated. For example, an operation 1509 may be executed that receives a power savings command. The operation 1509 may reside on the client 108. Once operation 1509 is executed, an operation 1510 is executed that retrieves power savings instructions. Once retrieved, then operation 1511 is executed that generates the disable condition 1512. This disable condition 1512 is then detected by the execution of an operation 1508 that checks for the disable condition 1512. Once detected, an operation 1513 is executed that shuts off power to the I/O port (e.g., I/O port 201) associated PHY components (e.g., transmitter, buffer(s), various parallel to serial and serial to parallel converters) and optionally to, for example, a line card, a signal processor 205, and other hardware/software implementations that may utilize electrical power.

Figure 16:
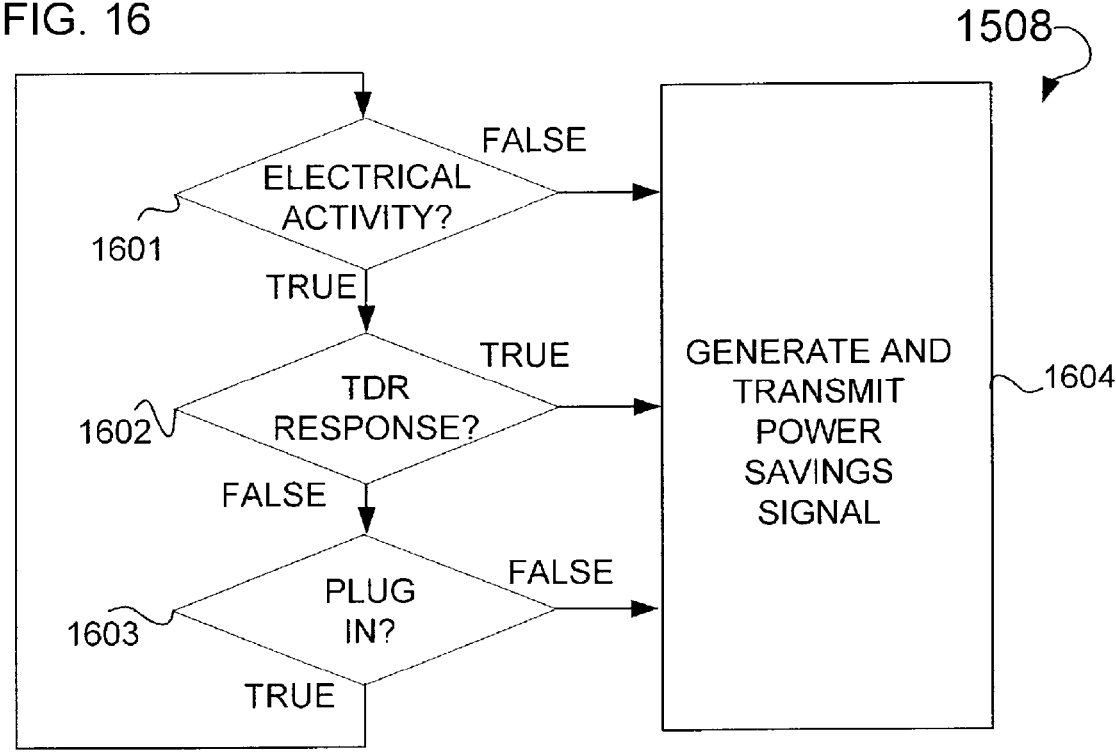
FIG. 16 is a flowchart illustrating a method, according to an example embodiment, of checking for a disable condition.

FIG. 16 is a flowchart illustrating a method, in accordance with an example embodiment, of checking for a disable condition (e.g., performing the operations 1508). Illustrated is a decision operation 1601 that determines whether or not electrical activity is present on a network cable (e.g., the network cable 203). In cases where a decision operation 1601 is "true," a second decision operation 1602 is executed that determines whether or not a TDR response has been received. In cases where a decision operation 1602 is "false," a further decision operation 1603 is executed that determines whether or not a network cable such as network cable 203 is actually plugged into the switch 103. In cases where decision operation 1603 is "true," a loop is formed such that decision operation 1601 is re-executed. In cases where decision operation 1601 is "false," decision operation 1602 is "true," or decision operation 1603 is "false," an operation 1604 is executed that generates and transmits a power saving signal. The use of one or more of these decision operations may, in some example embodiments, be based upon the configuration commands 1501 previously discussed by way of example. Accordingly, one or more of these decision operations may be used by themselves, or in combination with other decision operations for the purposes of determining whether or not an I/O port, and associated signal processor (e.g., components associated with the PHY), should be powered down.

Figure 17:
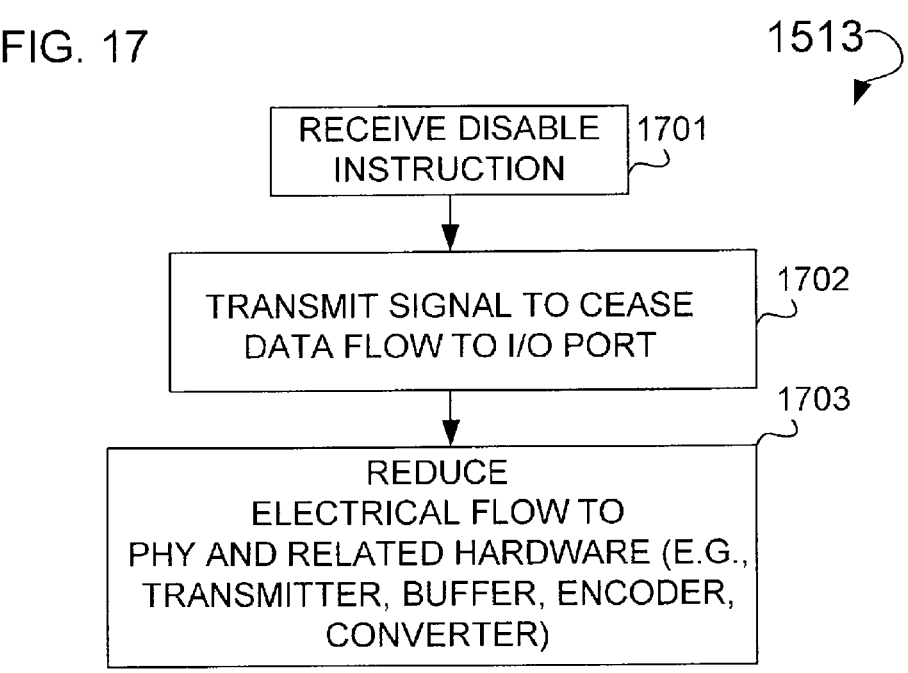
FIG. 17 is a flowchart illustrating a method, according to an example embodiment, of shutting off power to an I/O port.

FIG. 17 is a flowchart illustrating a method, according to an example embodiment, of shutting off power to an I/O port. The method may be used to execute operation 1513. Illustrated is an operation 1701 that receives a disable instruction. Once received, an operation 1702 is executed that transmits a signal to cease data flow to a particular I/O port such as, for example, I/O port 201. Next, an operation 1703 is executed that ceases or reduces electrical flow to a PHY and related components such as, for example, a transmitter, buffer, encoder, converter, etc. This PHY, as previously illustrated, may be part of, for example, a signal processor 205.

Figure 18:
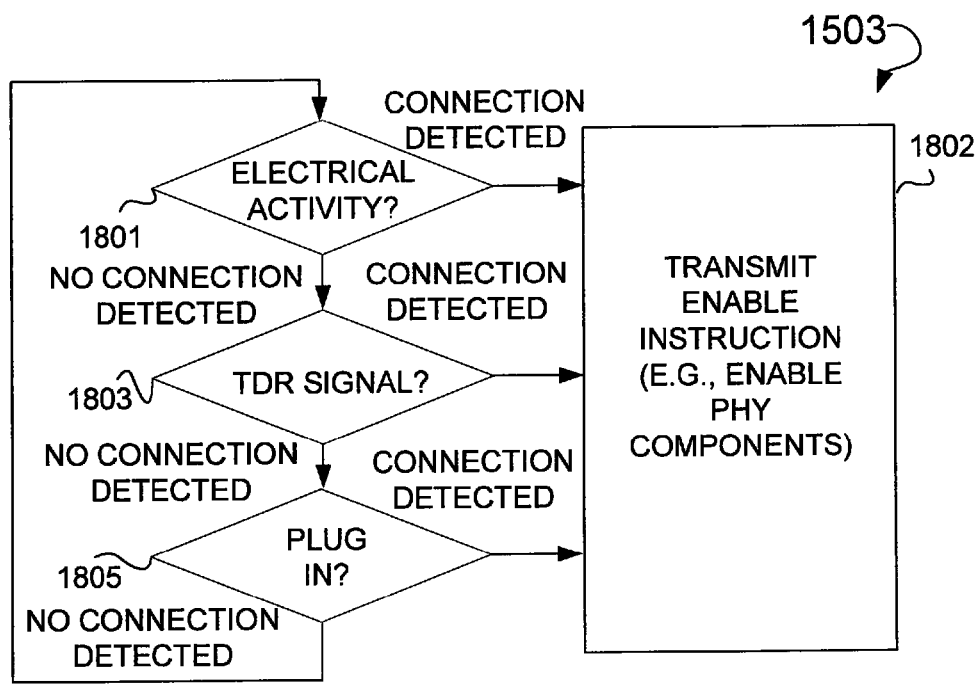
FIG. 18 is a flowchart illustrating a method, according to an example embodiment, of checking for connection condition to generate enable instructions.

FIG. 18 is a flowchart illustrating a method, according to an example embodiment, of checking for connection condition to generate enable instructions. The method may be used to implement operation 1503. Illustrated is a decision operation 1801 that determines whether or not electrical activity is present on a network cable (e.g., the network cable 203). In cases where decision operation 1801 evaluates to "no connection detected," a further decision operation 1803 is executed that determines whether or not a TDR signal is present. In cases where 1803 evaluates to "no connection detected," a further decision operation 1805 is executed that determines whether or not a physical connection exists. In cases where decision operation 1805 evaluates to, again, "no connection detected," then decision operation 1801 is re-executed. These three decision operations (e.g., 1801, 1803, and 1805) may be executed by themselves or in combination with other decision operations. These example decision operations, and the use of them, may be dictated by, for example, the configuration command 1501. In cases where any one of the decision operations 1801, 1803 or 1805 evaluates to "connection detected," that is, a connection is detected, a further operation 1802 is executed that transmits a enable instruction such that the PHY and its example components such as, for example, the transmitter, buffer, decoder/encoder, etc. are powered up, or otherwise enabled. As previously mentioned, this enable instruction may be absolute (e.g., seek to enable from a state where there is an absence of power), or relative in nature (e.g., enable from a lower to higher power level).

Figure 19:
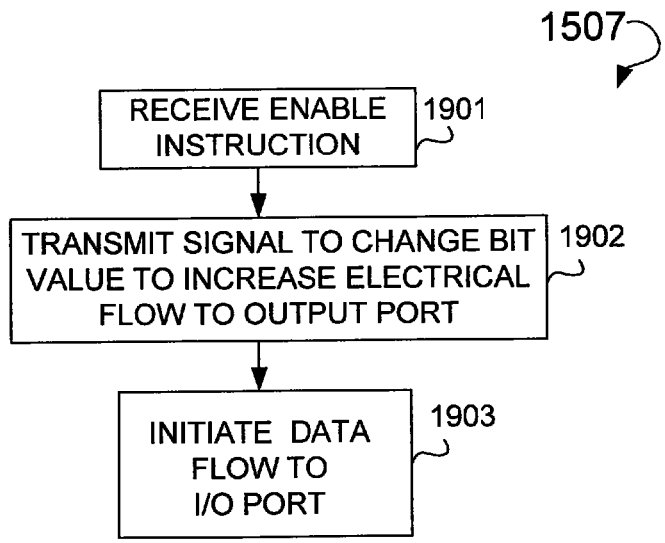
FIG. 19 is a flowchart illustrating a method, according to an example embodiment, of retrieving enable instructions that result in increased electrical power consumed by an I/O port.

FIG. 19 is a flowchart illustrating a method, according to an example embodiment, of retrieving enable instructions that result in increased electrical power consumed by an I/O port. The method may be used to implement operation 1507. Illustrated is an operation 1901 that receives the enable instruction. Once received, an operation 1902 is executed that transmits this signal to change a bit value to begin an electrical flow to an output port. In some example embodiments, some other way to initiate an electrical flow to the output port may be used. For example, some more complex instructions may be used than just the mere changing of a bit value. Once operation 1902 is executed, and operation 1903 is executed and initiates the data flow to the I/O port such as I/O port 205.

Transmission Between Network Devices

Some embodiments may utilize the Open Systems Interconnection Basic Reference (OSI) model or Transmission Control Protocol/Internet Protocol (TCP/IP) protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Example Embodiment of a Computer System

In some embodiments, the present invention is implemented on a digital processing system or computer system that includes a processor, which may represent one or more processors and may include one or more conventional types of such processors (e.g., x86, x86-64), such as an AMD processor, Intel Pentium processor or other suitable processor. A memory is coupled to the processor by a bus. The memory may be a Dynamic Random Access Memory (DRAM) and/or may include Static RAM (SRAM). The processor may also be coupled to other types of storage areas/memories (e.g., cache, Flash memory, disk, etc.), which could be considered as part of the memory or separate from the memory.

In some embodiments, a bus further couples the processor to a display controller, a mass memory or some type of computer-readable medium device, a modem or network interface card or adaptor, and an I/O controller. In some embodiments, the display controller controls, in a conventional manner, a display, which may represent a Cathode Ray Tube (CRT) display, a Liquid Crystal Display (LCD), a plasma display, or other type of suitable display device. Computer-readable medium, in some embodiments, may include a mass memory magnetic, optical, magneto-optical, tape, and/or other type of machine-readable medium/device for storing information. For example, the computer-readable medium may represent a hard disk, a read-only or writeable optical CD, etc. In some embodiments, a network adaptor card such as a modem or network interface card is used to exchange data across a network such as an internet. In some embodiments, the I/O controller controls I/O device(s), which may include one or more keyboards, mouse/trackball or other pointing devices, magnetic and/or optical disk drives, printers, scanners, digital cameras, microphones, etc.

In some embodiments, the present invention may be implemented entirely in executable computer program instructions which are stored on a computer-readable medium or may be implemented in a combination of software and hardware, or, in certain embodiments, entirely in hardware.

Embodiments within the scope of the present invention include computer-readable medium for carrying or having computer-executable instructions or data structures stored thereon. Such computer-readable medium may be any available medium, which is accessible by a general-purpose or special-purpose computer system. By way of example, and not limitation, such computer-readable medium can comprise physical storage medium such as RAM, ROM, Erasable Programmable Read-Only Memory (EPROM), CD-ROM or other optical-disk storage, magnetic-disk storage or other magnetic-storage devices, or any other medium which can be used to carry or store desired program code means in the form of computer-executable instructions, computer-readable instructions, or data structures and which may be accessed by a general-purpose or special-purpose computer system. This physical storage medium may be fixed to the computer system as in the case of a magnetic drive or removable as in the case of an Electronically Erasable Programmable Read-Only Memory (EEPROM) device (e.g., flash memory device).

In some embodiments, when information is transferred or provided over a network or another communications connection (e.g., either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable medium. Computer-executable or computer-readable instructions comprise, for example, instructions and data which cause a general-purpose computer system or special-purpose computer system to perform a certain function or group of functions. The computer-executable or computer-readable instructions may be, for example, binaries, or intermediate format instructions such as assembly language, or even source code.

In this description and in the following claims, a computer system is defined as one or more software modules, one or more hardware modules, or combinations thereof, that work together to perform operations on electronic data. For example, the definition of a computer system includes the hardware modules of a personal computer (PC), as well as software modules, such as the operating system of the PC. The physical layout of the modules is not important. A computer system may include one or more computers coupled via a network. Likewise, a computer system may include a single physical device (e.g., a mobile phone or Personal Digital Assistant (PDA)) where internal modules (e.g., a processor and memory) work together to perform operations on electronic data.

In some embodiments, the invention may be practiced in network computing environments with many types of computer system configurations, including hubs, routers, wireless Access Points (APs), wireless stations, PCs, laptop computers, hand-held devices, multi-processor systems, microprocessor-based or programmable consumer electronics, network PCs, minicomputers, mainframe computers, mobile telephones, PDAs, pagers, and the like. The system and method illustrated herein can also be practiced in distributed system environments where local and remote computer systems, which are linked (i.e., either by hardwired, wireless, or a combination of hardwired and wireless connections) through a network, both perform tasks. In a distributed system environment, program modules may be located in both local and remote memory-storage devices (see below).

Figure 20:
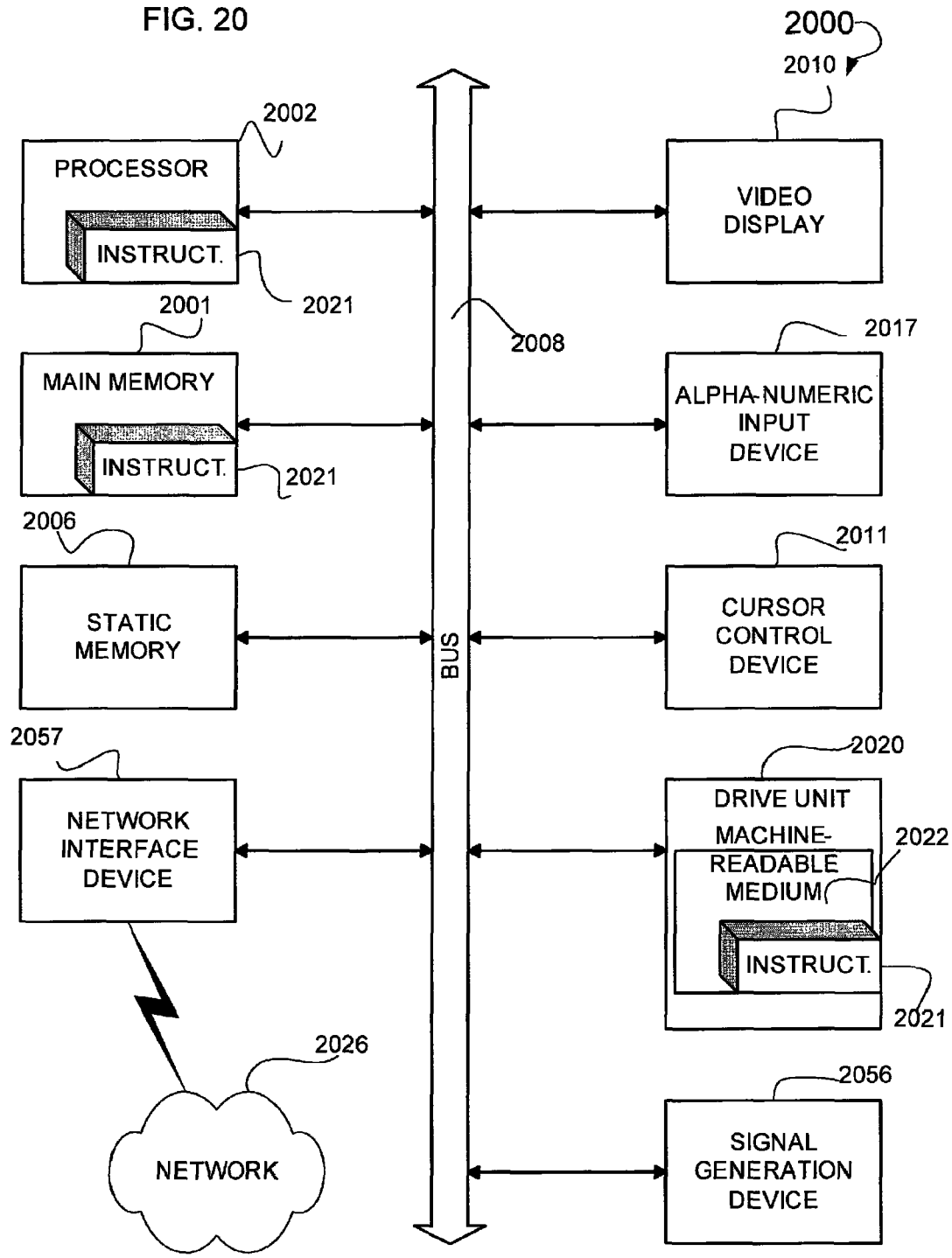
FIG. 20 shows a diagrammatic representation of machine in the example form of a computer system for executing instructions to perform any one or more of the methodologies described herein.

FIG. 20 shows a diagrammatic representation of machine in the example form of a computer system 2000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a PC, a tablet PC, a Set-Top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2000 includes a processor 2002 (e.g., a Central Processing Unit (CPU), a Graphics Processing Unit (GPU) or both), a main memory 2001 and a static memory 2006, which communicate with each other via a bus 2008. The computer system 2000 may further include a video display unit 2010 (e.g., a LCD or a CRT). The computer system 2000 also includes an alphanumeric input device 2017 (e.g., a keyboard), a user interface (UI) cursor controller 2011 (e.g., a mouse), a disk drive unit 2020, a signal generation device 2056 (e.g., a speaker) and a network interface device (e.g., a transmitter) 2057.

The disk drive unit 2016 includes a machine-readable medium 2022 on which is stored one or more sets of instructions (e.g., 2021) and data structures (e.g., software) embodying or utilized by any one or more of the methodologies or functions illustrated herein. The software may also reside, completely or at least partially, within the main memory 2001 and/or within the processor 2002 during execution thereof by the computer system 2000, the main memory 2001 and the processor 2002 also constituting machine-readable media.

The instructions 2021 may further be transmitted or received over a network 2026 via the network interface device 2057 utilizing any one of a number of well-known transfer protocols (e.g., Hyper-Text Transfer Protocol (HTTP), (Session Initiation Protocol (SIP)).

While the machine-readable medium 2022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

It is to be understood that the above description is intended to be illustrative and not restrictive. Although numerous characteristics and advantages of various embodiments as illustrated herein have been set forth in the foregoing description, together with details of the structure and function of various embodiments, many other embodiments and changes to details may be apparent to those of skill in the art upon reviewing the above description. The scope of the system and method illustrated herein should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels and are not intended to impose numerical requirements on their objects.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Description of Example Embodiments, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    detecting, at a network device, a connection condition signifying a requirement for an active connection between the network device and another network device, the network device having a plurality of ports, the network device and said other network device being connectible via a particular port of the plurality of ports;
    retrieving an enable instruction to enable the particular port, retrieving of the enable instruction being based upon the detecting of the connection condition; and
    enabling the particular port based upon the retrieved enable instruction, enabling of the particular port comprising changing a power consumption state of only the particular port of the plurality of ports, enabling of the particular port resulting in increased electrical power consumption by a port component associated with the particular port, the electrical power consumption being increased relative to a prior level of electrical power consumption in which the particular port is disabled.

2. The method of claim 1, further comprising detecting the connection condition using at least one of a line activity detector, a Time Domain Reflectometer (TDR) detector, an electro-mechanical switch, a discharge of a capacitor, an optical-electrical switch, or an optical detector.

3. The method of claim 1, further comprising detecting the connection condition using a PHY-based signal processor.

4. The method of claim 1, wherein the enable instruction is provide by a configuration command to enable at least one of a line activity detector, a Time Domain Reflectometer (TDR) detector, an electro-mechanical switch, a discharge of a capacitor, an optical-electrical switch, or an optical detector.

5. The method of claim 1, further comprising providing increased electrical power to a component of a PHY-based signal processor based upon the retrieved enable instruction.

6. The method of claim 1, wherein the particular port is a downlink Input/Output (I/O) port.

7. The method of claim 1, wherein the port component includes at least one of a transmitter, a buffer, an encoder, a decoder, a parallel to serial converter, or a serial to parallel converter.

8. A method comprising:
    detecting, at a network device, a disable condition that initiates a disabling of a particular port of a plurality of ports on the network device;
    retrieving a disable instruction to disable the particular port, retrieving of the disable instruction being based upon the detecting of the disable condition; and
    disabling the particular port based upon a retrieved disable instruction, disabling of the particular port comprising changing a power consumption state of only the particular port of the plurality of ports, disabling of the particular port resulting in reduced electrical power consumption by a port component associated with the particular port, the electrical power being reduced relative to a prior level of electrical power consumption in which the particular port is enabled.

9. The method of claim 8, further comprising detecting the disable condition using at least one of a line activity detector, a Time Domain Reflectometer (TDR) detector, a electro-mechanical switch, a discharge of a capacitor, an optical-electrical switch, or an optical detector.

10. The method of claim 8, further comprising detecting the disable condition using a PHY-based signal processor.

11. The method of claim 8, wherein the disable instruction is provided by a configuration command to disable at least one of a line activity detector, a Time Domain Reflectometer (TDR) detector, an electro-mechanical switch, a discharge of a capacitor, an optical-electrical switch, or an optical detector.

12. The method of claim 8, further comprising disabling a port connected to a PHY, based upon the retrieved disable instruction resulting in reduced electrical power, the electrical power reduced relative to a prior level of electrical power.

13. The method of claim 8, wherein the particular port is a downlink Input/Output (I/O) port.

14. The method of claim 8, wherein the port component includes at least one of a transmitter, a buffer, an encoder, a decoder, a parallel to serial converter, or a serial to parallel converter.

15. A network device comprising:
a plurality of ports to connect the network device to respective other devices in a network;
a first detector to detect a connection condition to signify a requirement for an active connection between the network device and another network device, the network device and said other network device being connectable via a particular port of the plurality of ports;
a retriever module to retrieve an enable instruction to enable the particular port, retrieval of the enable instruction being based upon the detecting of the connection condition; and
a first enabler to enable the particular port based upon the retrieved enable instruction, enabling of the particular port comprising changing a power consumption state of only the particular port of the plurality of ports, enabling of the particular port resulting in increased electrical power consumption by a port component associated with the particular port, the electrical power consumption increased relative to a prior level of electrical power consumption in which the particular port is disabled.

16. The network device of claim 15, further comprising a second detector to detect the connection condition using at least one of a line activity detector, a Time Domain Reflectometer (TDR) detector, an electro-mechanical switch, a discharge of a capacitor, an optical-electrical switch, or an optical detector.

17. The network device of claim 15, further comprising a second detector to detect the connection condition using a PHY-based signal processor.

18. The network device of claim 15, wherein the enable instruction is provided by a configuration command so as to enable at least one of a line activity detector, a Time Domain Reflectometer (TDR) detector, an electro-mechanical switch, a discharge of a capacitor, an optical-electrical switch, or an optical detector.

19. The network device of claim 15, further comprising providing a second enabler to provide increased electrical power to a component of a PHY-based signal processor based upon the retrieved enable instruction, the electrical power increased relative to a prior level of electrical power.

20. The network device of claim 15, wherein the particular port is a downlink Input/Output (I/O) port.

21. The network device of claim 15, wherein the port component includes at least one of a transmitter, a buffer, an encoder, a decoder, a parallel to serial converter, or a serial to parallel converter.

22. A network device comprising:
a plurality of ports connecting the network device to respective other devices in a network;
a first detector to detect a disable condition that initiates a disabling of a particular port is of the plurality of ports;
a retriever module to retrieve a disable instruction to disable the particular port, retrieval of the disable instruction being based upon the detecting of the disable condition; and
a first power reducer to disable the particular port based upon a retrieved disable instruction, disabling of the particular port comprising changing a power consumption state of only the particular port of the plurality of ports, disabling of the particular port resulting in reduced electrical power consumption by a port component associated with the particular port, the electrical power being reduced relative to a prior level of electrical power consumption in which the particular port is enabled.

23. The network device of claim 22, further comprising a second detector to detect the disable condition using at least one of a line activity detector, a Time Domain Reflectometer (TDR) detector, an electro-mechanical switch, a discharge of a capacitor, an optical-electrical switch, or an optical detector.

24. The network device of claim 22, further comprising a second detector to detect the disable condition using a PHY-based signal processor.

25. The network device of claim 22, wherein the disable instruction is provided by a configuration command to disable at least one of a line activity detector, a Time Domain Reflectometer (TDR) detector, an electro-mechanical switch, a discharge of a capacitor, an optical-electrical switch, or an optical detector.

26. The network device of claim 22, further comprising a second power reducer to disable a port connected to a PHY, based upon the retrieved disable instruction resulting in reduced electrical power, the electrical power reduced relative to a prior level of electrical power.

27. The network device of claim 22, wherein the particular port is an Input/Output (I/O) port.

28. The network device of claim 22, wherein the port component includes at least one of a transmitter, a buffer, an encoder, a decoder, a parallel to serial converter, or a serial to parallel converter.

29. An apparatus comprising:
means for detecting, at a network device, a connection condition signifying a requirement for an active connection between the network device and another network device, the network device having a plurality of ports, the network device and said other network device being connectible via a particular one of the plurality of ports;
means for retrieving an enable instruction to enable the particular port, retrieval of the enable instruction being based upon the detecting of the connection condition; and
means for enabling the particular port based upon the retrieved enable instruction, enabling of the particular port comprising changing a power consumption state of only the particular port of the plurality of ports, enabling of the particular port resulting in increased electrical power consumption by a port component associated with the particular port, the electrical power consumption being increased relative to a prior level of electrical power consumption in which the particular port is disabled.

30. An apparatus comprising:
means for detecting, at a network device, a disable condition that initiates a disabling of a particular port of a plurality of ports on the network device;
means for retrieving a disable instruction to disable the particular port, retrieval of the disable instruction being based upon the detecting of the disable condition; and means for disabling the particular port based upon a retrieved disable instruction, disabling of the particular port comprising changing a power consumption state of only the particular port of the plurality of ports, disabling of the particular port resulting in reduced electrical power consumption by a port component associated with the particular port, the electrical power being reduced relative to a prior level of electrical power consumption in which the particular port is enabled.

31. A non-transitory machine-readable medium comprising instructions, which when implemented by one or more machines cause the one or more machines to perform the following operations:
  detecting, at a network device, a connection condition signifying a requirement for an active connection between the network device and another network device, the network device having a plurality of ports, the network device and said other network device being connectible via a particular one of the plurality of ports;
  retrieving an enable instruction to enable the particular port, retrieving of the enable instruction being based upon the detecting of the connection condition; and
  enabling the particular port based upon the retrieved enable instruction, enabling of the particular port comprising changing a power consumption state of only the particular port of the plurality of ports, enabling of the particular port resulting in increased electrical power consumption by a port component associated with the particular port, the electrical power consumption being increased relative to a prior level of electrical power consumption in which the particular port is disabled.

32. A non-transitory machine-readable medium comprising instructions, which when implemented by one or more machines cause the one or more machines to perform the following operations:
  detecting, at a network device, a disable condition that initiates a disabling of a particular port of a plurality of ports on the network device;
  retrieving a disable instruction to disable the particular port, retrieving of the disable instruction being based upon the detecting of the disable condition; and
  disabling the particular port based upon a retrieved disable instruction, disabling of the particular port comprising changing a power consumption state of only the particular port of the plurality of ports, disabling of the particular port resulting in reduced electrical power consumption by a port component associated with the particular port, the electrical power being reduced relative to a prior level of electrical power consumption in which the particular port is enabled.

* * * * *